Nov. 16, 1937.   W. O. KENYON ET AL   2,099,341
COLORED CELLULOSE ESTER SHEETING
Filed Feb. 9, 1935

Fig. 1.

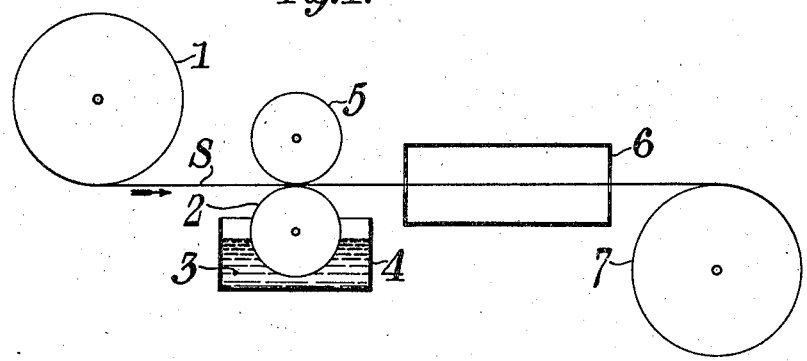

Fig. 2.

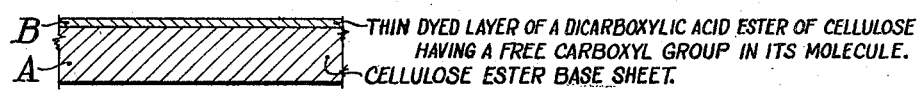

B — THIN DYED LAYER OF A DICARBOXYLIC ACID ESTER OF CELLULOSE HAVING A FREE CARBOXYL GROUP IN ITS MOLECULE.
A — CELLULOSE ESTER BASE SHEET.

Fig. 3.

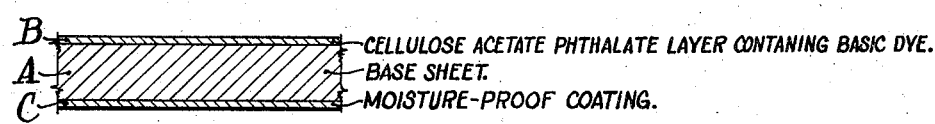

B — CELLULOSE ACETATE PHTHALATE LAYER CONTAINING BASIC DYE.
A — BASE SHEET.
C — MOISTURE-PROOF COATING.

Inventors:
William O. Kenyon & Russel H. Van Dyke,
By Newton M. Perrin
Daniel I. Mayne
Attorneys.

Patented Nov. 16, 1937

2,099,341

UNITED STATES PATENT OFFICE 2,099,341

COLORED CELLULOSE ESTER SHEETING

William O. Kenyon and Russell H. Van Dyke, Rochester, N. Y., assignors, by mesne assignments, to Eastman Kodak Company, Jersey City, N. J., a corporation of New Jersey Application February 9, 1935, Serial No. 5,798

2 Claims. (Cl. 91—68)

This invention relates to the production of cellulose ester sheet materials and more particularly to colored sheeting in which the color is carried by a superficial surface layer with which it is chemically united.

The production of various types of colored cellulosic sheeting has heretofore generally been carried out, either by treating the surface of the sheeting with a solution or suspension of a coloring material, followed by evaporation of the solvent, or by incorporating the color directly in the solution from which the sheet itself is formed. Various modifications of the former method have been employed, especially in the manufacture of coated sheeting of various kinds where the color may be dissolved in, or mixed with, the coating material. In addition to these methods, various mordanting processes have been employed which involve the incorporation of some chemical agent, either into the body of the sheeting itself, or into the coating applied thereto, which has the power of chemically uniting with, or adsorbing the color and thereby holding it in the finished product. Many of the products produced by the above mentioned methods, especially those in which the color is carried by surface layers or coatings, are unsatisfactory due to the fact that the color is insufficiently bound to or held by the coating and has a tendency to rub off or run and streak.

The present invention has for its principal object to overcome the above-mentioned difficulties, particularly with reference to the production of surface-colored products. A further object is to provide a type of colored cellulose ester sheeting in which the coloring material does not run or streak and effectively resists removal even under severe friction. A still further object is to produce a type of thin, flexible, substantially transparent cellulose ester wrapping material having a surface which, not only carries the color, but also is capable of permanently retaining water-soluble adhesives, such as those met with in the use of revenue stamps, labels, sealing strips, and the like. Other objects will appear hereinafter.

We have found that these objects may be accomplished by coating one or both of the surfaces of a cellulose ester sheet with an extremely thin colored layer containing a dicarboxylic acid ester of cellulose having a free carboxyl group in its molecule. A notable example of this type of ester is cellulose acetate phthalate which may be prepared by treating a cellulose acetate having free and available hydroxyl groups with phthalic anhydride in the presence of a tertiary organic base, such as pyridine or quinoline, as described in the U. S. patent to C. J. Malm and C. E. Waring, No. 2,093,462 issued September 21, 1937, in which application there is also disclosed a similar method for the preparation of other dicarboxylic acid esters of cellulose, such as cellulose acetate succinate.

In the practice of our invention, a solution of the ester is made up in appropriate solvents, colored by the addition of a suitable dyestuff, preferably a basic dye, and then coated onto a cellulose ester base sheet, such as one composed of cellulose acetate, for example. The layer or coating thus produced, upon evaporation of solvents and appropriate drying, is extremely thin, being possibly not more than 20 or 30 microns in thickness, and due to the nature of the dicarboxylic acid ester material itself and the penetrating or swelling action on the base sheet of the solvents in which the ester is dissolved, this layer is substantially continuous with the base sheet material. The color, which should preferably be of basic character, such as a dye of the type of basic Fuchsin, Malachite Green, Gentian Violet, Crystal Violet, Aurive, Safranin, Safranine A, Orange IV, etc., is added to the coating solution in an appropriate amount, preferably sufficient to give about a 2% solution of the dye.

Typical examples of suitable coating compositions are as follows:

|  | Percent |
|---|---|
| I. Cellulose acetate-phthalate (32% phthalyl) | 2 |
| Gentian Violet | 2 |
| Solvent (75% by volume benzene—25% by volume ethyl cellosolve) | 96 |
| II. Cellulose acetate phthalate (32% phthalyl) | 2 |
| Malachite Green | 3 |
| Solvent (45% by volume toluene—55% ethyl cellosolve) | 95 |
| III. Cellulose acetate phthalate (32% phthalyl) | 2 |
| Fuchsin | 2 |
| Solvent (67.5% by volume benzene—32.5% methyl cellosolve) | 96 |
| IV. Cellulose acetate succinate (21.7% succinyl) | 2 |
| Crystal Violet | 2 |
| Solvent (72% by volume benzene—28% methyl cellosolve) | 96 |

In the following examples and description we have set forth several of the preferred embodiments of our invention, but they are included merely for purposes of illustration and not as a limitation thereof.

In the accompanying drawing:

Figure 1 is a schematic outline of a typical method of coloring a cellulose ester sheet in accordance with the invention.

Figure 2 is a cross section through a sheet produced in accordance with the process outlined in Figure 1, and Figure 3 represents a section through a slightly modified form of sheeting which has a moisture-resistant coating on the surface opposite the colored surface.

It will, of course, be understood with reference to Figures 2 and 3 that the thickness of the sheeting and the various coatings applied thereto have been greatly exaggerated in the interest of clearness of illustration and are not intended in any way to represent the actual dimensions.

The numeral 1 designates a supply roll from which a sheet of cellulose acetate is fed, in the direction indicated by the arrow, to a coating apparatus. The latter comprises an applicator roll 2 dipping in a coating solution 3 contained in vat 4, said solution comprising a dicarboxylic acid ester of cellulose having a free carboxyl group in its molecule, dissolved in suitable solvents, said solution containing a basic dye, such as Malachite Green. The roll 2 carries up the colored coating solution in the desired amount and deposits it on the under-surface of the sheet S by contact, the thickness of the coating being regulated by the roll 5 which may be adjusted toward or away from roll 2 by adjusting means (not shown). After leaving the applicator roll 2, the coated sheet then passes to the drying chamber 6 through which is passed a current of warm air where solvents are evaporated and the sheet appropriately dried. Upon leaving the drying chamber 6, the sheet passes to wind-up roll 7 and is then in condition for use.

Referring to Figure 2, A represents a base sheet of cellulose ester material, such as cellulose acetate, having thereon an extremely thin coating B comprising a dicarboxylic acid ester of cellulose, such as cellulose acetate phthalate, and containing a basic dye.

Referring to Figure 3, the base sheet A also has the thin coating B of the same general nature as the corresponding portions of the structure of Figure 2, the material disclosed differing therefrom only in the fact that the opposite side of the sheeting has coated thereon a thin layer C composed of a moistureproofing composition, composed for example, of a mixture of gum and wax.

It will be evident that our invention is applicable both to the treatment of relatively thin sheeting, such as is employed for wrapping purposes and to the treatment of much thicker materials, such as photographic film support and allied products. If a moistureproof sheet is desired, this may be obtained by applying an appropriate solution of gum and wax to the side of the sheeting opposite the color-containing layer. An appropriate method of moisture-proofing thin sheeting is that disclosed in the application of Norman F. Beach and Bruce E. Gramkee, Serial No. 551,491, filed July 17, 1931, in which a solution containing a mixture of gum and wax is coated on to a cellulose derivative sheet, followed by appropriate drying. An alternative method of moisture-proofing the sheet is described in the U. S. patent to Norman F. Beach and James G. McNally, No. 2,019,648, issued November 5, 1935, in which the sheet is coated first by application of a solution of a gum, followed by application of a solution of a wax. Other appropriate moistureproofing treatment may be applied if desired.

While we have found it convenient to illustrate our invention by reference to certain colored coating compositions containing specific amounts of the various ingredients, our invention is in no sense limited thereto, as many changes may be made in both the ingredients and proportions within the scope of our invention. For example, various solvents or solvent combinations for dissolving the dicarboxylic acid ester of cellulose may be employed. The solvent should, of course, be one in which the ester is readily soluble and which has a slight solvent, or at least a softening or swelling action on the cellulose ester base sheet material to which it is applied in order that the base may be properly prepared for the anchoring of the dye coating thereto. It will, of course, be evident that too drastic a solvent action is to be avoided, since this would weaken the base sheet material and render the application of the coating composition difficult, if not impossible. We have found that a mixture of about 75% by volume of benzene and 25% of ethyl or methyl cellosolve is ideal for the purposes of our invention. Other solvent combinations which may be employed are toluene-ethyl cellosolve, toluene-methyl cellosolve, and benzene-methyl cellosolve. Many other combinations will suggest themselves to those skilled in the art.

Our invention is applicable to any of the known types of cellulose ester sheeting, but it is especially adapted to the coloring of cellulose acetate thin sheeting. It has been found by other investigators that the mixed cellulose organic esters of the type of cellulose acetate phthalate having a free carboxyl group in the molecule, when applied to this type of sheeting render it capable of permanently retaining water-soluble adhesives, and it is accordingly one of the features of the sheeting produced in accordance with our invention that it is on this account, likewise capable of permanently receiving such adhesives. Our product is, however, particularly distinguished by the manner in which the color is anchored to the sheeting, our invention being based upon the observation that a basic dye reacts with the free carboxyl of the dicarboxylic acid ester and is thus chemically united to the surface of the sheeting. This is in marked contrast to merely imbedding a coloring matter, such as a dye or pigment, in, or coating it onto, the surface of a sheet material, as in that case the color is merely held mechanically on the surface where it can be rubbed off.

Our invention makes possible the production of colored sheeting or other products adapted for a wide variety of uses. It is especially adapted to the manufacture of those types of colored thin sheeting employed for wrapping purposes where permanence and uniformity of coloring is of especial importance. It may also be used for making the thicker types of colored sheeting and even for the coloring of plastic cellulose ester products, such as molded cellulose acetate articles of various kinds.

What we claim is:

1. A thin, flexible, substantially transparent cellulose ester wrapping material which is moistureproof and capable of permanently retaining water-soluble adhesives which comprises a cellulose acetate base sheet coated on at least one surface with a water-insoluble dicarboxylic acid ester of cellulose having a free carboxyl group in its molecule and a basic dye chemically united to the dicarboxylic acid ester.

2. A thin, flexible, substantially transparent cellulose ester wrapping material which is moisture-proof and capable of permanently retaining water-soluble adhesives which comprises a cellulose acetate base sheet coated on one surface with cellulose acetate phthalate and a basic dye chemically united to the cellulose acetate phthalate and coated on the other surface with a moisture-proofing composition.

WILLIAM O. KENYON.
RUSSEL H. VAN DYKE.